United States Patent
Tanaka et al.

[11] Patent Number: 5,454,507
[45] Date of Patent: Oct. 3, 1995

[54] METHOD FOR VACUUM BRAZING ALUMINUM MEMBERS

[75] Inventors: Yasuyuki Tanaka, Gamagori; Nobuhiko Yamada, Hekinan; Yoshihito Mizugaki, Okazaki; Katsuaki Fukui, Aichi; Hiroto Hayashi, Nagoya, all of Japan

[73] Assignee: Nippondenso Co., Ltd., Kariya, Japan

[21] Appl. No.: 193,856

[22] Filed: Feb. 9, 1994

[30] Foreign Application Priority Data

Feb. 12, 1993 [JP] Japan ................................. 5-024475
Mar. 8, 1993 [JP] Japan ................................. 5-046873
Mar. 9, 1993 [JP] Japan ................................. 5-048221

[51] Int. Cl.⁶ .................................................. B23K 1/008
[52] U.S. Cl. ................................. 228/221; 228/262.51
[58] Field of Search ........................... 228/183, 199, 228/217, 221, 222, 234.1, 262.51; 219/85.13, 85.17, 74

[56] References Cited

U.S. PATENT DOCUMENTS

| | | | |
|---|---|---|---|
| 3,673,678 | 7/1972 | Moreau et al. | 228/217 |
| 4,221,561 | 9/1980 | Limque et al. | 432/128 |
| 4,804,128 | 2/1989 | Brittin | 228/217 |
| 4,808,788 | 2/1989 | Bares | 219/85 E |
| 4,842,643 | 6/1989 | van Wijk | 266/149 |
| 4,886,449 | 12/1989 | Brittin | 432/121 |
| 4,897,115 | 1/1990 | van Wijk | 75/63 |

FOREIGN PATENT DOCUMENTS

| | | |
|---|---|---|
| 54-58662 | 5/1979 | Japan . |
| 55-33881 | 3/1980 | Japan . |
| 60-20081 | 2/1985 | Japan . |
| 63-52764 | 3/1988 | Japan . |
| 63-115678 | 5/1988 | Japan . |
| 63-199071 | 8/1988 | Japan . |
| 63-199070 | 8/1988 | Japan . |
| 4279275 | 10/1992 | Japan . |

*Primary Examiner*—Samuel M. Heinrich
*Attorney, Agent, or Firm*—Cushman, Darby & Cushman

[57] ABSTRACT

A vacuum furnace for brazing aluminum with brazing metal containing magnesium in which evaporated magnesium in the furnace is oxidized before aluminum members having been brazed are taken out, and/or the temperatures of a movable wall serving to control the communication between a vacuum pump and a heating chamber during heating and of an inner surface of the heating chamber are maintained at above a specified temperature at which evaporated magnesium does not adhere, and/or a heating member which is to be excited electrically and electrodes used for electrically exciting the heating member, which are the constituents of a heater for heating the aluminum members and the brazing metal, are hermetically sealed and insulated from the inside of the heating chamber.

4 Claims, 11 Drawing Sheets

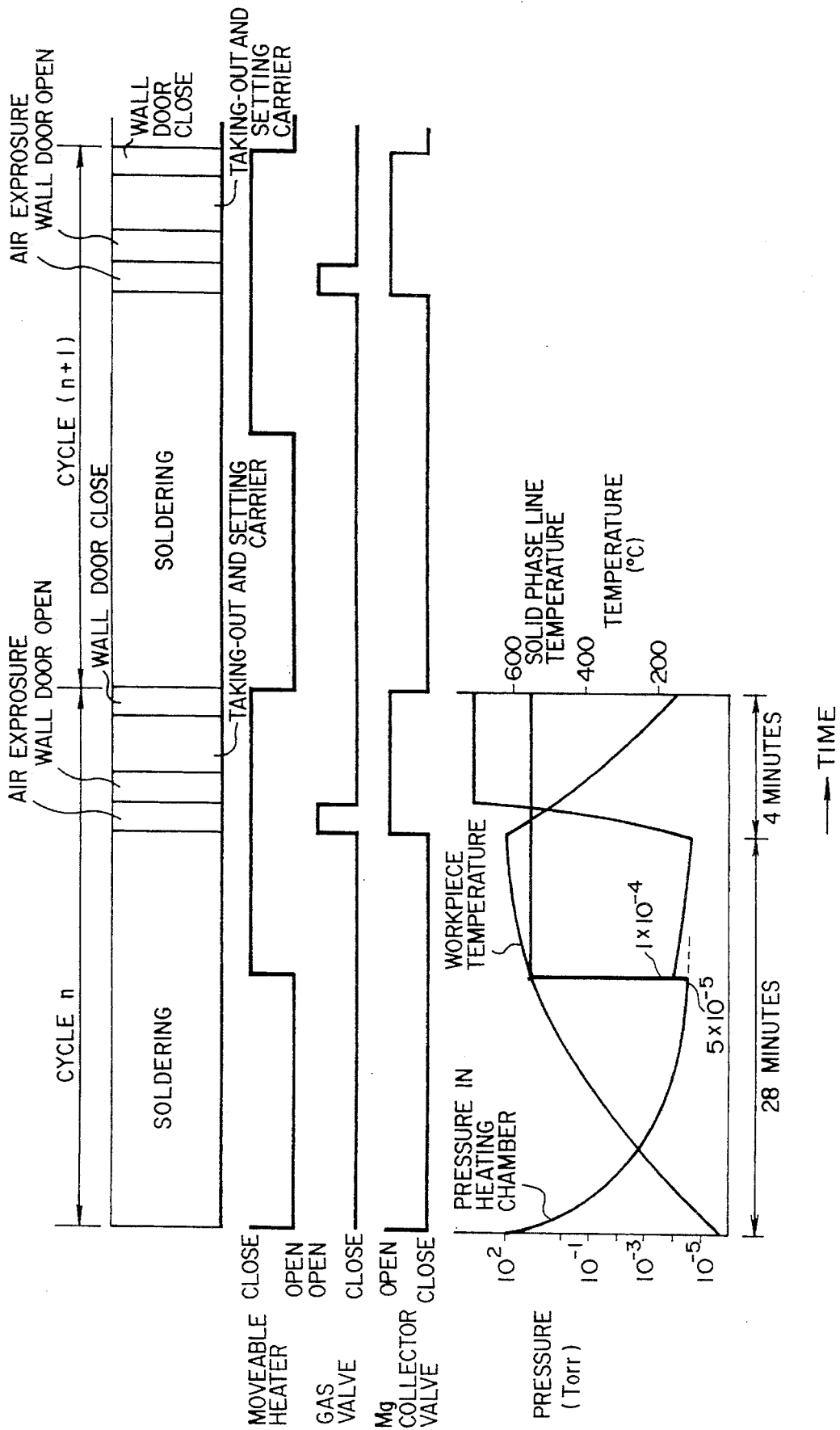

METHOD FOR VACUUM BRAZING ALUMINUM MEMBERS

BACKGROUND OF THE INVENTION AND RELATED ART STATEMENT

The present invention relates to an aluminum vacuum brazing furnace and, more specifically, to an aluminum vacuum brazing furnace which is used for brazing aluminum members constituting an aluminum heat exchanger, such as an automobile radiator, an automobile air-conditioning evaporator, a condenser or the like.

An aluminum vacuum brazing furnace is conventionally known as disclosed in Japanese Patent Unexamined Publication No. 63-52764.

Objective of the vacuum brazing furnace disclosed in the above publication is to prevent deterioration of the vacuum atmosphere in the heating chamber due to magnesium vapor from the brazing metal. In order to achieve this objective, the above-described conventional aluminum vacuum brazing furnace has heating chamber formed within the furnace body. A gas ventilating hole, through which the inside and the outside of the heating chamber are in communication is formed in a portion of a wall defining the heating chamber. The gas ventilating hole can be opened and closed by a movable wall so that, when the temperature in the heating chamber reaches approximately the magnesium evaporation temperature, the gas ventilating hole is closed by the movable wall so as to seal the evaporated magnesium in the heating chamber, thereby preventing magnesium from scattering to the vacuum exhaust system and the like.

However, the present inventors have noted that the evaporated magnesium adheres to a sealing portion between the movable wall and the gas ventilating hole to hinder the perfect sealing of the gas ventilating whole. Accordingly, the evaporated magnesium in the heating chamber scatters from within the heating chamber to the exhaust pump system, the magnesium content in the brazing metal must be relatively high and there gives rise to an irregular motion of the movable wall.

As a result of investigation by the present inventors, the above-described problems occur for the following reason. Namely, according to the prior art, since the temperature of the furnace body is relatively low (about 70°~80° C. and since the movable wall is not provided with a heater, then when the gas ventilating hole is not closed by the movable wall, the temperature of the movable wall is affected by the low temperature of the furnace body temperature so as to become lower than a temperature (400° C.) at which the evaporated magnesium can adhere. Accordingly when the movable wall is moved so as to close the gas ventilating hole, the evaporated magnesium adheres to the movable wall of low temperature.

Generally, the conventional aluminum vacuum brazing furnace is so constructed that, after the aluminum members combined with the magnesium containing brazing metal are carried into the heating chamber, the heating chamber is evacuated to form a vacuum atmosphere and is heated to above a melting point of the brazing metal so as to braze the aluminum members (see, for example, Japanese Patent Unexamined Publication No. 63-52764). Here, the reason why the brazing metal contains magnesium is that it is possible to break the oxide film of aluminum during the brazing to perform the brazing satisfactorily.

However, the present inventors have found that, after finishing the conventional brazing process, when the brazed aluminum works are taken from the heating chamber and aluminum members which are to be brazed are carried in the heating chamber, the heating chamber is exposed to the atmospheric air so that the evaporated magnesium in the heating chamber is oxidized to become powdered magnesium oxide. The magnesium oxide powder in turn accumulates on the floor surface of the heating chamber, and the magnesium oxide thus accumulated is typically scattered into the vacuum exhaust system at the time of getting a vacuum for the brazing cycle, resulting in the irregular operation, deterioration of performance, clogging of filter and the like of the pumps used for performing the vacuum evacuation. Further, in order to prevent such problems, a cleaning operation to remove the accumulation of magnesium oxide must performed frequently by hand. Moreover, since evaporated magnesium which is not yet oxidized is present in the heating chamber and since the impact energy is large in general when the evaporated magnesium is oxidized, the heating chamber is very dangerous. Accordingly the cleaning operation must be performed carefully paying attention to this fact.

The conventional aluminum vacuum brazing furnace is so constructed that after the aluminum members combined with the brazing metal containing magnesium are carried in the heating chamber within the furnace body, the heating chamber is evacuated to form a vacuum atmosphere and the brazing metal is heated to above the melting point thereof to braze the aluminum members. The heating chamber is therefore provided with a heater for heating the brazing metal to above the melting point thereof.

With regard to heating the brazing metal, it is desirable to heat the razing metal uniformly. However, in order to heat the brazing metal uniformly, it is necessary to arrange the heater at a relatively long distance from the brazing metal. Accordingly, the heater must generate a sufficiently high output power to heat the brazing metal even from a relatively long distance. According to such demand, the main current of the conventional heater was the strip heater of Fe—Cr—Ni group in which a heating element and electrode units (including insulators) connected to both ends of the heating member are exposed.

However, the present inventors have found that in the above-described conventional heater, magnesium evaporated from the brazing metal during the vacuum brazing adheres to low-temperature portions including the insulator of the electrode unit, thereby reducing the insulation resistance of the insulator and risking a short-circuit accident in the heater.

Further, the present inventors have found that when the heating chamber is exposed to atmospheric air after taking out the brazed aluminum members, evaporated magnesium floating in the heating chamber is oxidized to become powdered magnesium oxide which in turn scatters and adheres to the heating member, the electrode units and the like. Accordingly, it is necessary to perform a cleaning operation to remove the magnesium oxide adhered to the heating member. However, complicated configurations of the heating member, the electrode units makes the cleaning operation troublesome.

OBJECT AND SUMMARY OF THE INVENTION

An object of the present invention is to provide an aluminum vacuum brazing furnace which is capable of positively preventing adhesion of evaporated magnesium not only to the wall of a heating chamber but also to a movable wall.

The movable wall is made to be in the opened state when the heating chamber is evacuated to form a vacuum atmosphere, and is made to be changed from the opened state to the closed state when the temperature in the heating chamber reaches approximately a temperature at which magnesium is caused to evaporate. At this time, since the inner surface temperature of the heating chamber including the movable wall is raised by heater means to above a specified temperature at which evaporated magnesium does not adhere, there is no possibility that the evaporated magnesium adheres to the wall inner surface of the heating chamber, with the result that it becomes possible to maintain the movable wall in the perfect closed state at all times. Accordingly, it is possible to prevent the evaporated magnesium in the heating chamber from leaking out through the sealing portion of the movable wall to scatter to an exhaust pump system, and hence, the magnesium content of brazing metal can be set to take a small value. In consequence, the amount of magnesium oxide produced in the furnace after the brazing is reduced drastically, and therefore, maintenance operation for removing the magnesium oxide is very simplified. Further, it becomes possible to prevent the irregular movement of the movable wall.

Another object of the present invention is to prevent the irregular operation, deterioration of performance, clogging of filter and the like of the pumps of a vacuum exhaust system, to eliminate the complicated cleaning operation and to remove evaporated magnesium with safety by oxidizing evaporated magnesium positively and collecting magnesium oxide automatically.

An air exposure means serves, after finishing the brazing, to expose the inside of the heating chamber to the atmospheric air such as dry air of −40° C. Owing to this air exposure, evaporated magnesium from the brazing metal is oxidized to become magnesium oxide. The magnesium oxide is received by a receiving means and is then separated and collected by a separating and collecting means.

As described above, according to the present invention, after the brazing, evaporated magnesium is positively oxidized to become magnesium oxide. This magnesium oxide is collected automatically, and therefore, it is possible to prevent the irregular operation, deterioration of performance, clogging of filter and the like of the pumps of the vacuum exhaust system, to eliminate the complicated cleaning operation and to remove evaporated magnesium with safety.

A further main object of the present invention is to provide an aluminum vacuum brazing furnace heater which is capable of preventing the occurrence of a short-circuit accident of heater attributable to the evaporated magnesium and facilitating the heater cleaning operation for removing the magnesium oxide.

BRIEF DESCRIPTION OF THE DRAWINGS

FIG. 11 is a time chart for explanation of the aluminum vacuum brazing method which utilizes the above aluminum vacuum brazing furnace.

DETAILED DESCRIPTION OF PREFERRED EMBODIMENT

Description will be given below of an embodiment of the present invention with reference to the drawings.

Figure 1:
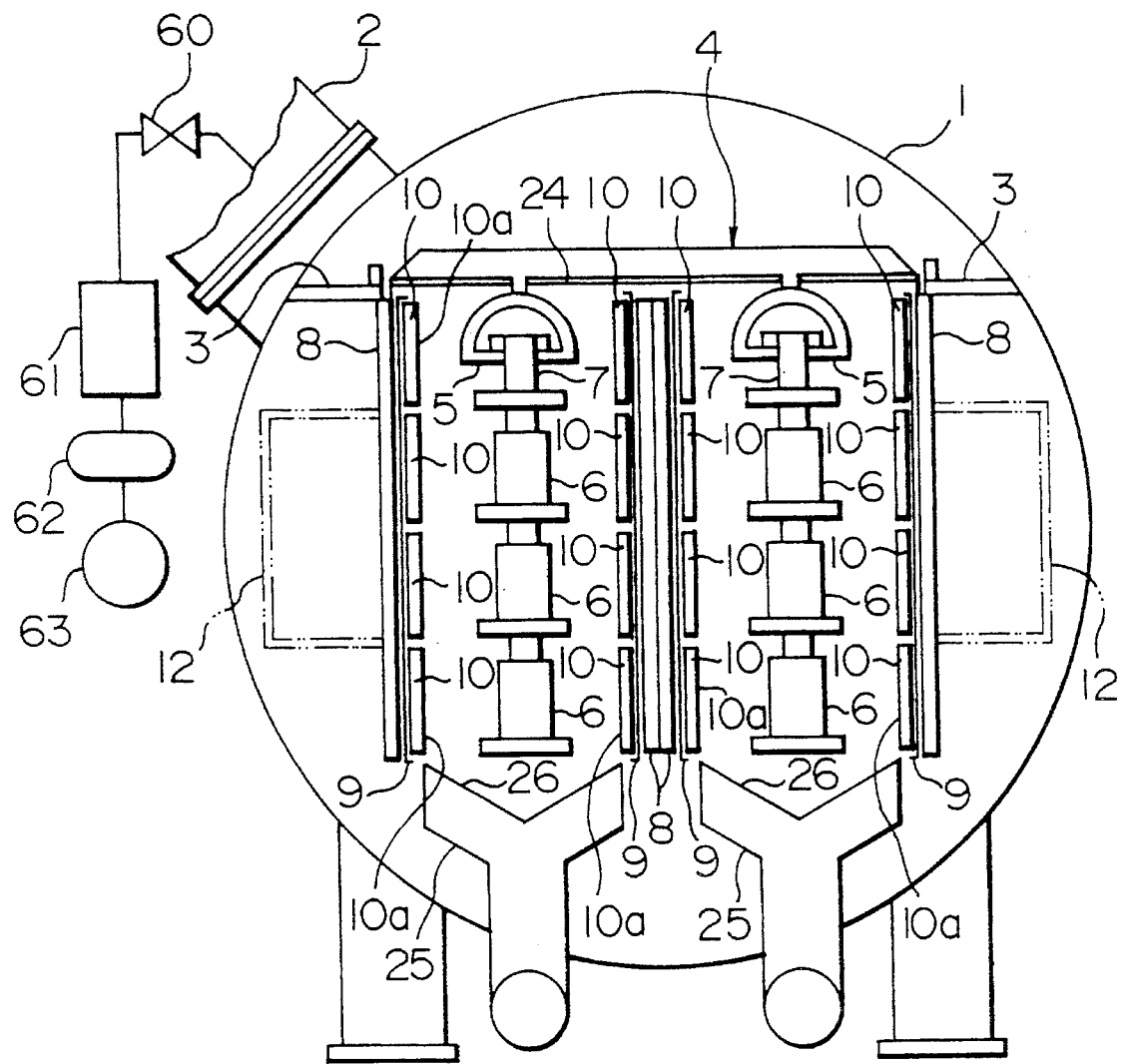
FIG. 1 is a front view showing the inside of an aluminum vacuum brazing furnace according to an embodiment.
Figure 2:
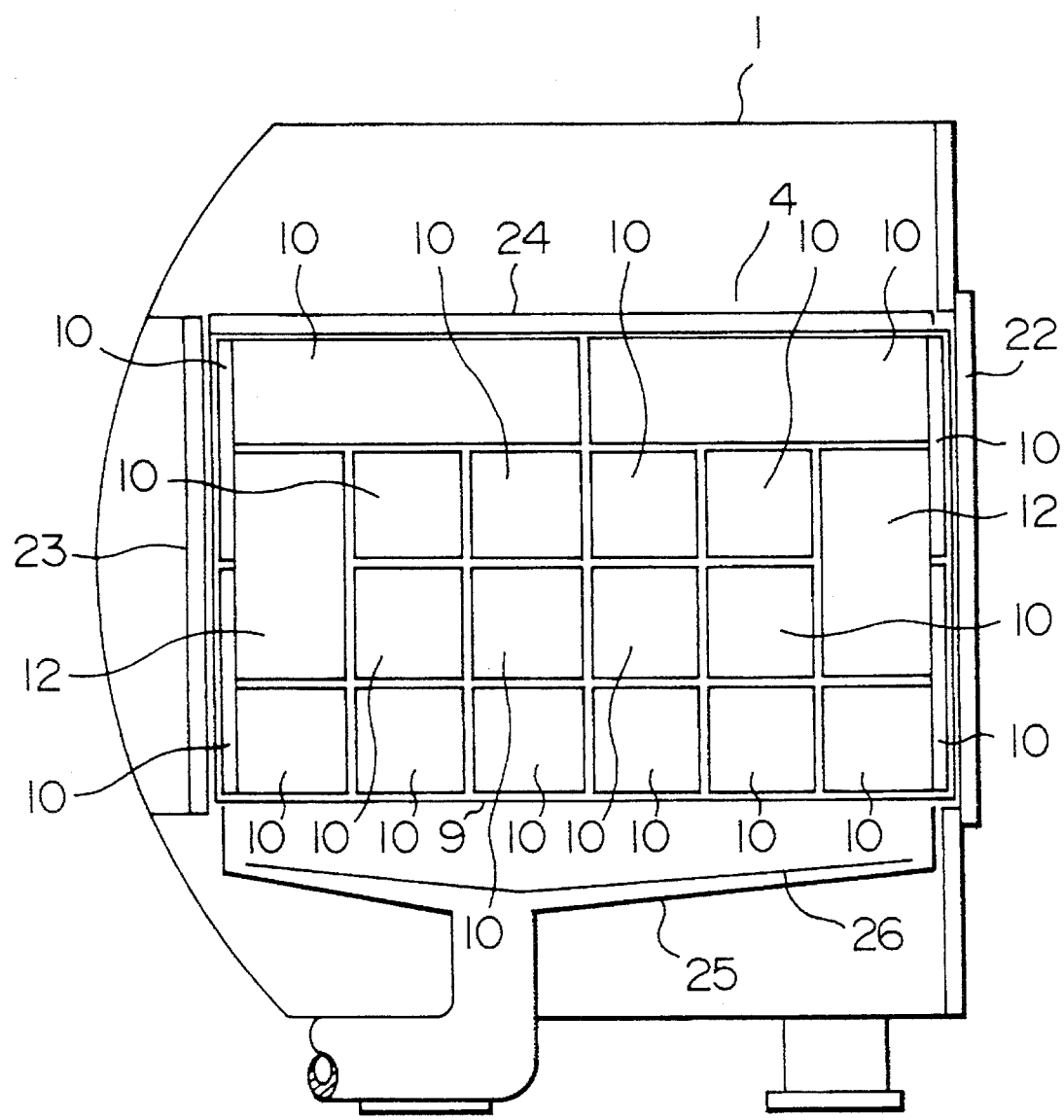
FIG. 2 is a side view showing the inside of the same as well.

FIGS. 1 and 2 show schematically the general construction of an aluminum vacuum brazing furnace according to an embodiment of the present invention.

In FIGS. 1 and 2, reference numeral 1 denotes a furnace body formed substantially in the shape of a cylinder in the horizontal direction. The furnace body 1 is provided with an exhaust port 2 of a vacuum exhaust system so that it communicates with the interior space of the furnace body. The exhaust port 2 is communicated with a change-over valve 60, a diffusion pump 61, a mechanical booster pump 62 and a rotary pump 63 which are parts of the vacuum exhaust system, in the mentioned order. Rails 3 are projected in the upper part of the furnace body 1 and heater modules constituting a heating chamber 4 are hung on these rails 3. Carrier rails 5 are hung from the ceiling of the heating chamber 4, and carriers 7 on which brazed works to be brazed or soldered (aluminum members combined with, coated with, covered by or cladded with brazing metal or filler metal containing magnesium) 6 are placed are hung from these carrier rails 5 in plural layers in the vertical direction. The carriers 7 are movable in the direction perpendicular to the paper of FIG. 1.

Figure 5:
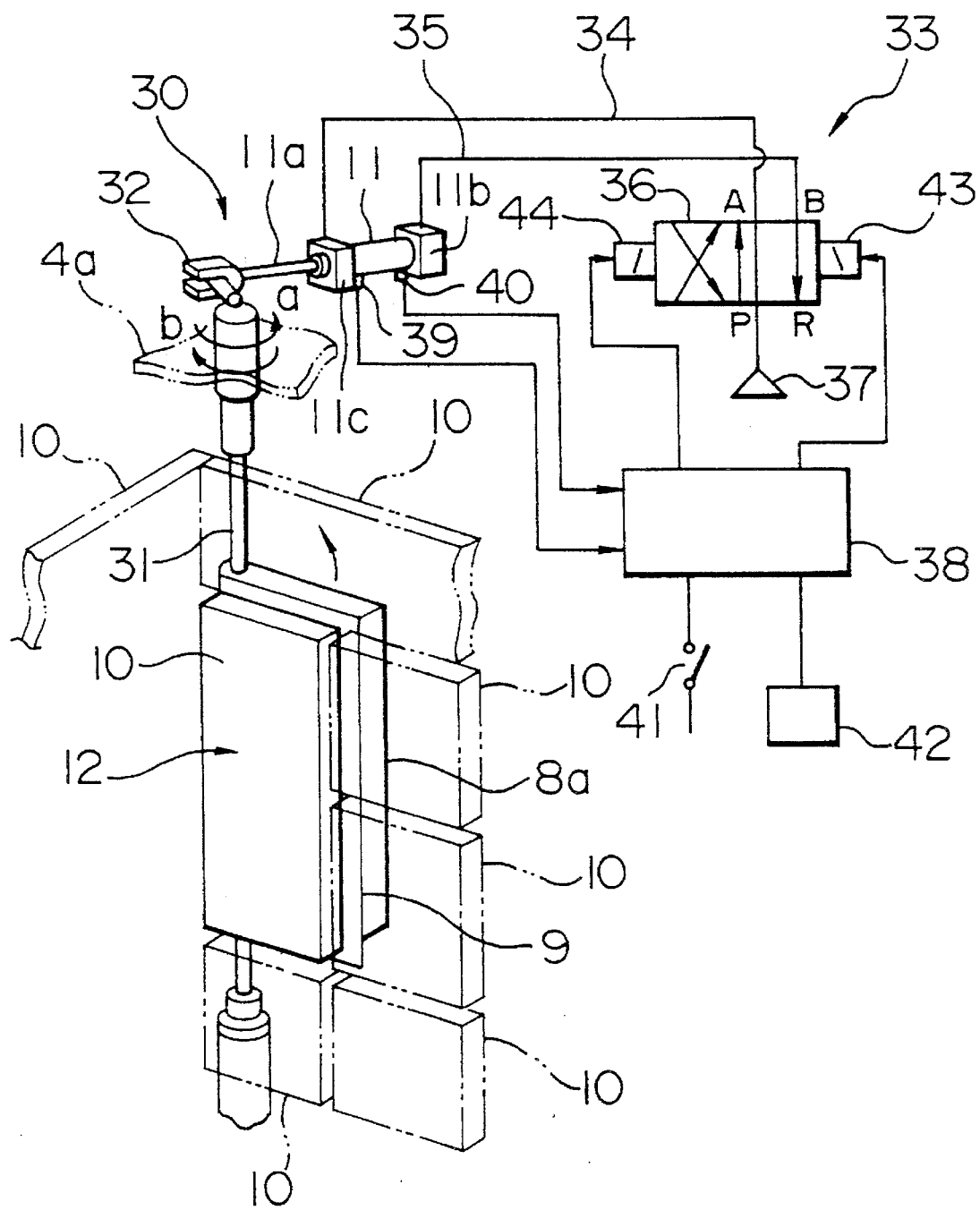
FIG. 5 is a perspective view showing a construction of a movable wall.

In this embodiment, two heating chambers 4 are formed separately from each other on right and left in FIG. 1. On the inner surfaces of side walls 8 of each heating chamber 4 exclusive of the ceiling and the bottom surface, plural pairs of thermal reflecting plate 9 and heater 10 as heater means are provided in correspondence to the positions of the brazed works 6. And, as shown in FIG. 5, a portion 8a of the wall 8 of the heating chamber 4 is allowed to be opened and closed by driving means 30 comprising an air cylinder 11 and the like (which is not limited to the one shown in FIG. 5 that is operated rotatively), and on the inner surface of this portion 8a are provided as well the pair of thermal reflecting plate 9 and heater 10. Accordingly, the heating chamber 4 is partially allowed to be opened and closed by means of the above-described movable wall (movable door with heater) 12. Incidentally, in the case of this embodiment, two movable walls 12 are formed in each heating chamber 4 in the side surface thereof adjacent to the furnace body 1 so as to be located at the positions adjacent to a front door 22 and a rear door 23 as shown in FIG. 2. Further, the front door 22 to be operated when the brazed works 6 are carried in and taken out of the heating chamber 4 and the rear door 23 to be operated at the time of the maintenance and inspection are each provided on the inner surface thereof with the pair of thermal reflecting plate 9 and heater 10 as well.

The driving means 30 serving to drive the above-described movable wall 12 is constructed as follows.

A rotary shaft 31 is fixed to the movable wall 12 at the end portion thereof adjacent to the front door 22 or the rear door 23 so as to be extended in the vertical direction. Above the ceiling 4a of the heating chamber 4, the rotary shaft 31 is connected to a rod 11a of the air cylinder 11 through a connecting member 32 so that when the rod 11a is in its rear end position the movable wall 12 is held in its closed position, when the rod 11a is in its forward end position the movable wall 12 is held in its open position, when the rod 11a is moved forwardly from its rear end position the movable wall 12 is opened from its closed position since the rotary shaft 31 is rotated in the direction of an arrow mark a, and when the rod 11a is moved backward from its forward end position the movable wall 12 is closed from its open position since the rotary shaft 31 is rotated in the direction of an arrow mark b. The above-described movement of the air cylinder 11 is realized by supplying and discharging air to and from a head-side chamber 11b and a rod-side chamber 11c in the cylinder 11, respectively, in accordance with the control procedure to be described later.

Next, air cylinder control means 33 will be described.

The air cylinder control means 33 comprises air hoses 34, 35 which are communicated with the inside of the head-side chamber 11b and the rod-side chamber 11c of the air cylinder 11. The air hose 34 communicated with the rod-side chamber 11c is connected to a port A of a four-port two-position change-over solenoid valve 36, while the air hose 35 communicated with the head-side chamber 11b is connected to a port B of the solenoid valve 36. Incidentally, to an admission port P of the solenoid valve 36 is connected an air source 37 which serves to generate compressed air of density 4 kg/cm$^2$, for example.

The solenoid valve 36 is driven by a valve driving circuit 38. To the valve driving circuit 38 are fed a signal from an open position detecting switch 39 which is used to confirm the open position of the movable wall 12 and turned on when the rod 11a is in its forward end position, a signal from a closed position detecting switch 40 which is used to confirm the closed position of the movable wall 12 and turned on when the rod 11a is in its rear end position, a signal from a front door closed position detecting switch 41 which is used to confirm that the front door 22 is moved from its open position to its closed position and turned on when the front door 22 is brought to its closed position, and a signal from a temperature sensor 42 which serves to detect the temperature of the brazed work 6 within the heating chamber 4 and to send a signal indicative of the value of voltage proportional to the detected temperature. And, based on these input signals, application of electric current to two electromagnetic solenoids 43, 44 of the solenoid valve 36 is controlled. It is noted here that one electromagnetic solenoid 43 is a solenoid for closing use which is to be applied with the electric current when the movable wall 12 is rotated to or maintained in its closed position, while the other electromagnetic solenoid 44 is a solenoid for opening use which is to be applied with the electric current when the movable wall 12 is rotated to or maintained in its open position.

The valve driving circuit 38 makes the electric current pass through the closing solenoid 43 when the movable wall 12 is in its closed position. In this case, the rod 11a is in its rear end position and the closed position detecting switch 40 is turned on. In such state that the movable wall 12 is in its closed position, as the front door 22 is closed for the commencement of the brazing, the front door closed position detecting switch 41 is turned on so that the electric current is passed through the opening solenoid 44 while the electric current passed through the closing solenoid 43 is cut off. Accordingly, the spool of the solenoid valve 36 is hung over so that the head-side chamber 11b of the air cylinder 11 is supplied with air and the rod-side chamber 11c thereof is exhausted, with the result that the rod 11a is moved forwardly to thereby open the movable wall 12. Due to this opening movement of the movable wall 12, the closed position detecting switch 40 is turned off while the open position detecting switch 39 is turned on. Thereafter, as the temperature of the brazed work 6 within the heating chamber 4 is increased until it reaches approximately the evaporation temperature of magnesium (545° C., for example), the output voltage of the temperature sensor 42 exceeds the reference voltage so that the electric current is passed through the closing solenoid 43 while the electric current passed through the opening solenoid 44 is cut off. In consequence, the spool of the solenoid valve 36 is returned to its original position so that the rod-side chamber 11c of the air cylinder 11 is supplied with air and the head-side chamber 11b thereof is exhausted, with the result that the rod 11a is moved back to thereby close the movable wall 12.

The brazed works 6 are, for example aluminum heat exchangers, including automobile radiators, evaporators for automobile air-conditioners and condensers. The brazing metal used for brazing them is composed of such elements as shown in Table 1 in the following.

TABLE 1

| Components | % | Melting point | | Brazing |
|---|---|---|---|---|
| | | Solid Phase | Liquid Phase | Temperature Range °C. |
| Si | 11.0 – 13.0 | | | |
| Fe | 0.8 or less | | | |
| Cu | 0.25 or less | | | |
| Mn | 0.10 or less | 559 | 579 | 580 – 600 |
| Mg | 0.6 | | | |
| Zn | 0.20 or less | | | |
| Al | balance | | | |

Moreover, a hopper 25 serving to collect magnesium oxide and the like which are to be produced when the inside of the heating chamber 4 is exposed to the atmospheric air on completing the vacuum brazing, is disposed within the furnace body 1 at the position below the heating chamber 4, and a thermal reflecting plate 26 is provided on the top of the hopper 25.

Figure 6:
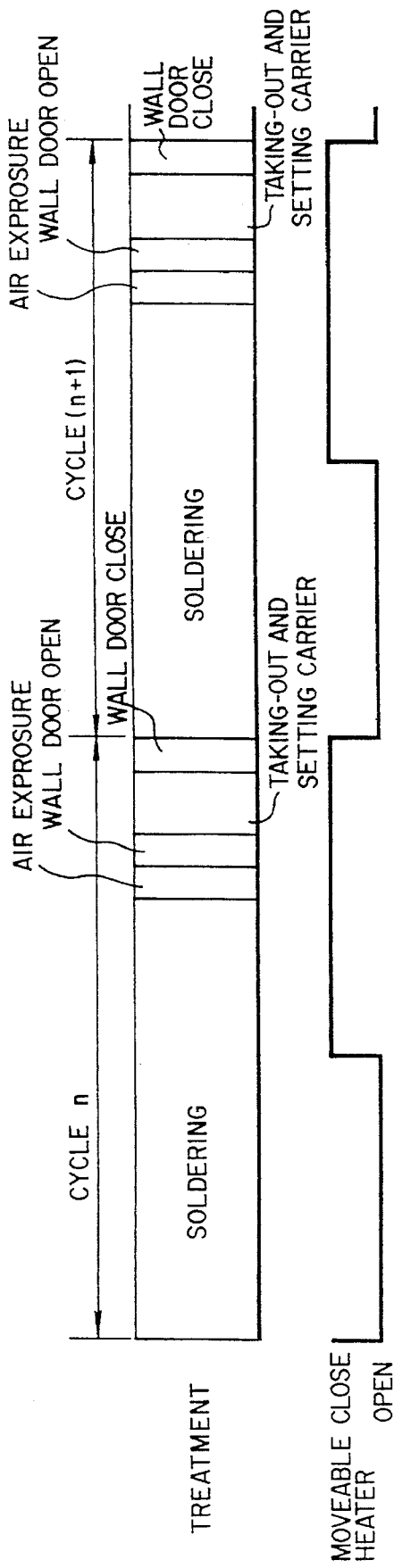
FIG. 6 is a time chart for explanation of an aluminum vacuum brazing method which utilizes the above aluminum vacuum brazing furnace.
Figure 6:
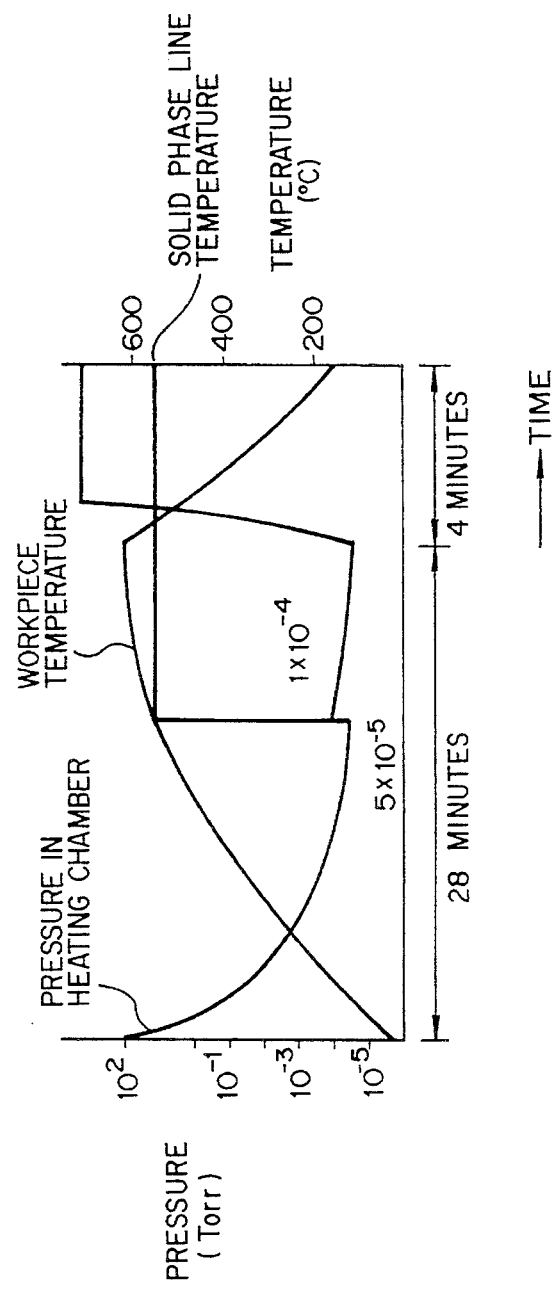

Next, description will be given of a vacuum brazing method which utilizes the aluminum vacuum brazing furnace having the above-described construction with reference to FIG. 6 in addition.

First, the brazing on the n-th cycle is started. The brazing is started in the state that the brazed works 6 are carried in the heating chamber 4 and the front door 22 is closed. By closing the front door 22, the valve driving circuit 38 is operated to pass the electric current through the opening solenoid 44 but cut off the electric current passed through the closing solenoid 43, thereby bringing the movable wall 12 to its open position. And, the change-over valve 60 of the vacuum exhaust system is opened so as to start to exhaust the inside of the heating chamber 4 by means of the diffusion pump 61, the mechanical booster pump 62 and the rotary pump 63. On starting the exhausting, the pressure in the heating chamber 4 is reduced as shown in FIG. 6 so that the degree of vacuum is increased, while the temperature of the brazed works 6 in the heating chamber 4 is increased as shown in FIG. 6 heat from the heater 10 is applied with the electric current. And, as the brazed work temperature is raised up approximately to the magnesium evaporation temperature (for example, 545° C.) as shown in FIG. 6, the output voltage of the temperature sensor 42 exceeds the reference voltage and, accordingly, as described before, the valve driving circuit 38 is operated to apply the electric current to the closing solenoid 43 but cut off the electric current applied to the opening solenoid 44, resulting in that the movable wall 12 is closed. Incidentally, in place of the method in which the brazed work temperature is detected directly by the temperature sensor 42, the brazed work temperature may be detected indirectly by taking notice of the fact that the brazed work temperature correlates with the time elapsed after the electric current is started to be passed through the heater 10, it is judged by timer means whether or not the electric current has been passed through the heater 10 over the required time set on the basis of the experimental data.

As the movable wall 12 is closed, magnesium evaporated from the brazing metal due to the subsequent increase of the temperature of the brazed works 6 is sealed in the heating chamber 4. It is noted here that the movable wall 12 is closed, the inner surface of the movable wall 12 is heated by the heater 10 of the movable wall 12 and the wall portion of the heating chamber around the gas ventilating hole which is closed by the movable wall 12 is also heated by other heaters 10, and accordingly, the inner surface of the movable wall 12 and the wall portion around the gas ventilating hole are held in a high-temperature state with little possibility that they are cooled by being influenced by the furnace body 1 of low temperature. For this reason, after the movable wall 12 is closed, evaporated magnesium hardly adheres to the sealing portion between the movable wall 12 and the gas ventilating hole. In consequence, it is possible to eliminate the disadvantage of the prior art that since the movable wall 12 is not shielded perfectly during the brazing from next time, the degree of vacuum in the heating chamber 4 is deteriorated, so that the magnesium content in the brazing metal must be set to take a large value. In other words, according to the present embodiment, the magnesium content in the brazing metal can be set to take a small value. Further, since the perfect shielding efficiency of the movable wall 12 is improved, such problem can be eliminated as well that evaporated magnesium is absorbed by the diffusion pump 61, the mechanical booster pump 62, the rotary pump 63 and the like so as to cause the irregular operation of these pumps 61, 62 and 63.

Thereafter, after the lapse of the time required for the brazing process, the inside of the heating chamber 4 is exposed to the atmospheric air. This atmospheric air exposure is performed by opening an atmospheric air passage which, although omitted from the illustration, communicates from the furnace body 1 to the atmospheric air and has been in the closed state tile that time. Owing to this air exposure, almost all magnesium in the heating chamber 4 is oxidized to become magnesium oxide (powder). The magnesium oxide and the remaining magnesium are collected by a magnesium collecting apparatus (not shown) comprising the hopper 25 as its constituent.

Subsequently, the front door 22 is opened, the carrier 7 is taken out, the brazed works 6 having been brazed are taken off, the brazed works 6 to be nest brazed are set on the carrier 7, the carrier 7 is thrown into, and the front door 22 is closed. As the front door 22 is closed, the front door closed position detecting switch 41 is turned on as described before, so that the valve driving circuit 38 is operated to apply the electric current to the opening solenoid 44 but cut off the electric current applied to the closing solenoid 43, resulting in that the movable wall 12 is opened. Then, the brazing on the (n+1)-th cycle is started.

As described in the foregoing, in the aluminum vacuum brazing furnace according to the present embodiment, the movable wall 12 is made to be in the open state when the heating chamber 4 is evacuated to form a vacuum atmosphere and is moved from the open state to the closed state when the temperature in the heating chamber 4 reaches approximately the magnesium evaporation temperature. At this time, since the temperature of the inner surface of the heating chamber 4 including the movable wall 12 is raised by the heater 10 up to above a specified temperature at which the evaporated magnesium doesn't adhere, the evaporated magnesium is prevented from adhering to the inner surface of the wall 8 of the heating chamber 41, with the result that the movable wall 12 can be maintained in the perfect closed state at all times. In consequence, the evaporated magnesium in the heating chamber 4 can be prevented from leaking out through the sealing portion of the movable wall 12 and scattering to the vacuum exhaust system 2, 60, 61, 62, 63 and the like, the magnesium content in the brazing metal can be set to take a small value, and the amount of magnesium oxide produced after the brazing can be reduced drastically. Further, it becomes possible as well to prevent the irregular motion of the movable wall 12.

Further, according to the present embodiment, insulators 18 of the heater 10 are located on the back side of a box 13 and, moreover, the front surface of the box 13 reaches a high temperature so that the evaporated magnesium is, so to speak, reflected by the front surface of the box 13, and therefore, there is little possibility that the evaporated magnesium adheres to the insulator, with the result that it is also possible to prevent a short-circuit accident of heater resulting from the reduction of the insulation ability of the insulator attributable to the adhesion of evaporated magnesium.

Figure 7:
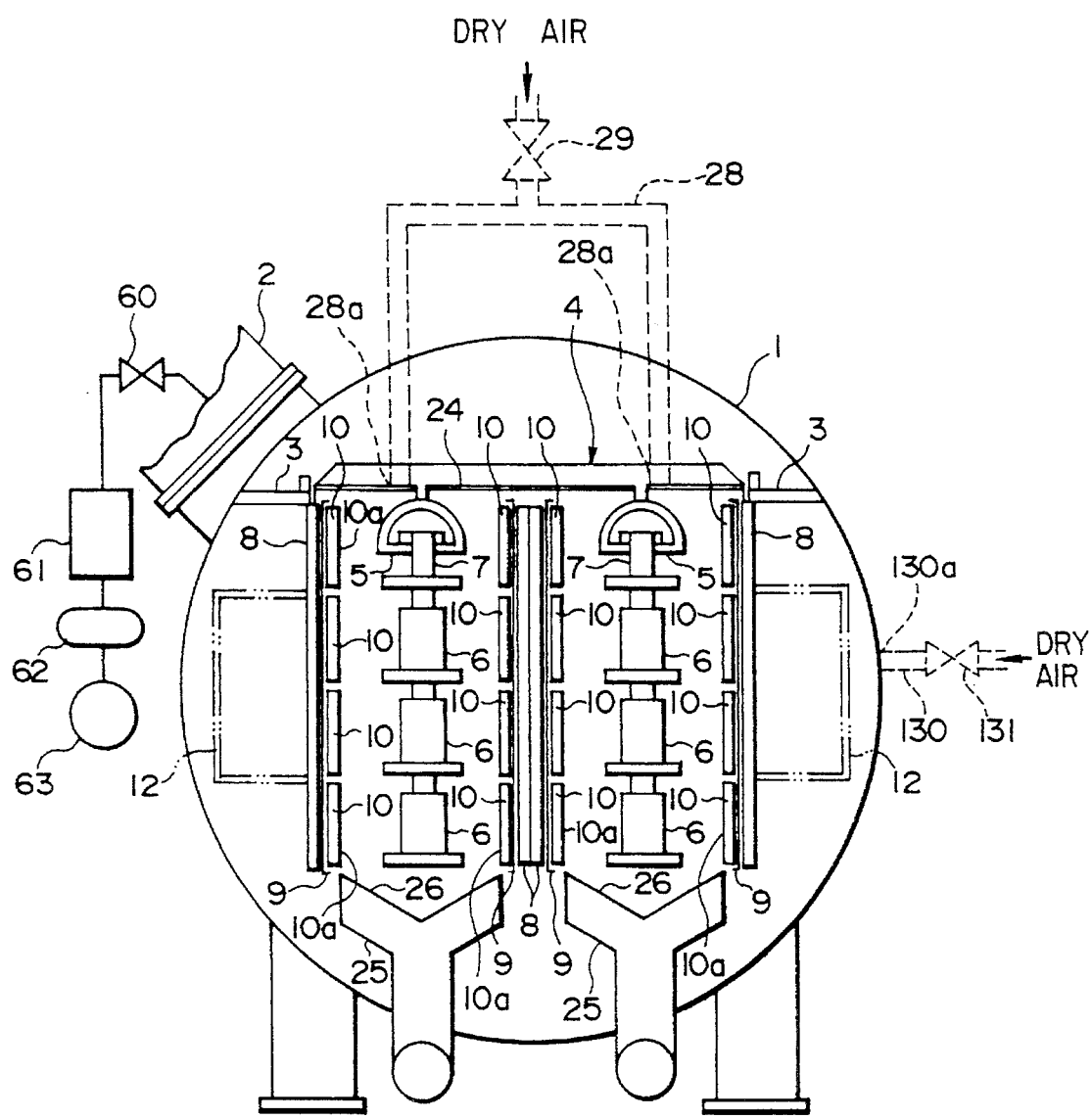
FIG. 7 is a front view showing schematically the inside of a furnace main body portion of the aluminum vacuum brazing furnace according to an embodiment.
Figure 8:
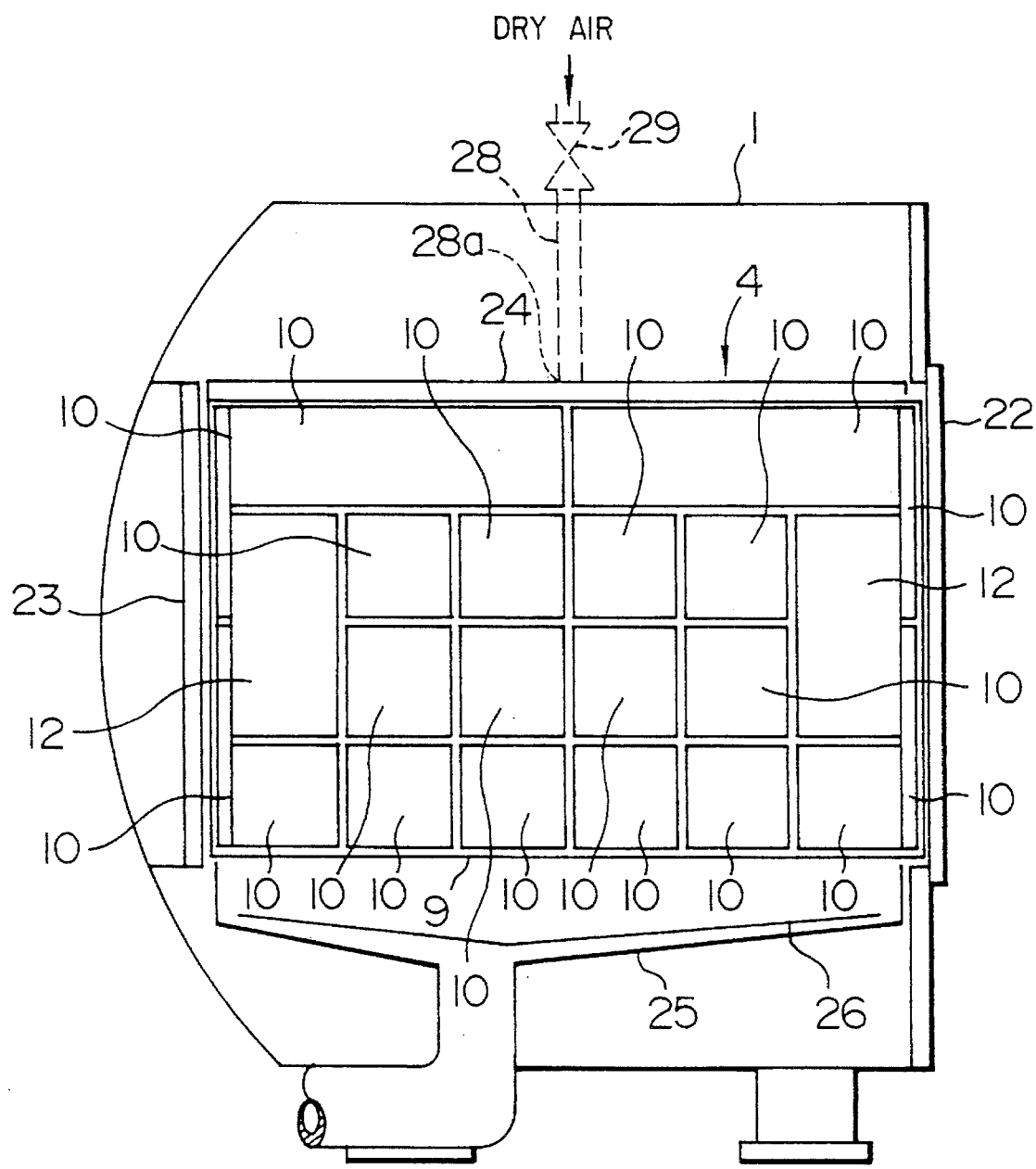
FIG. 8 is a side view showing schematically the inside of the furnace main body portion as well.
Figure 9:
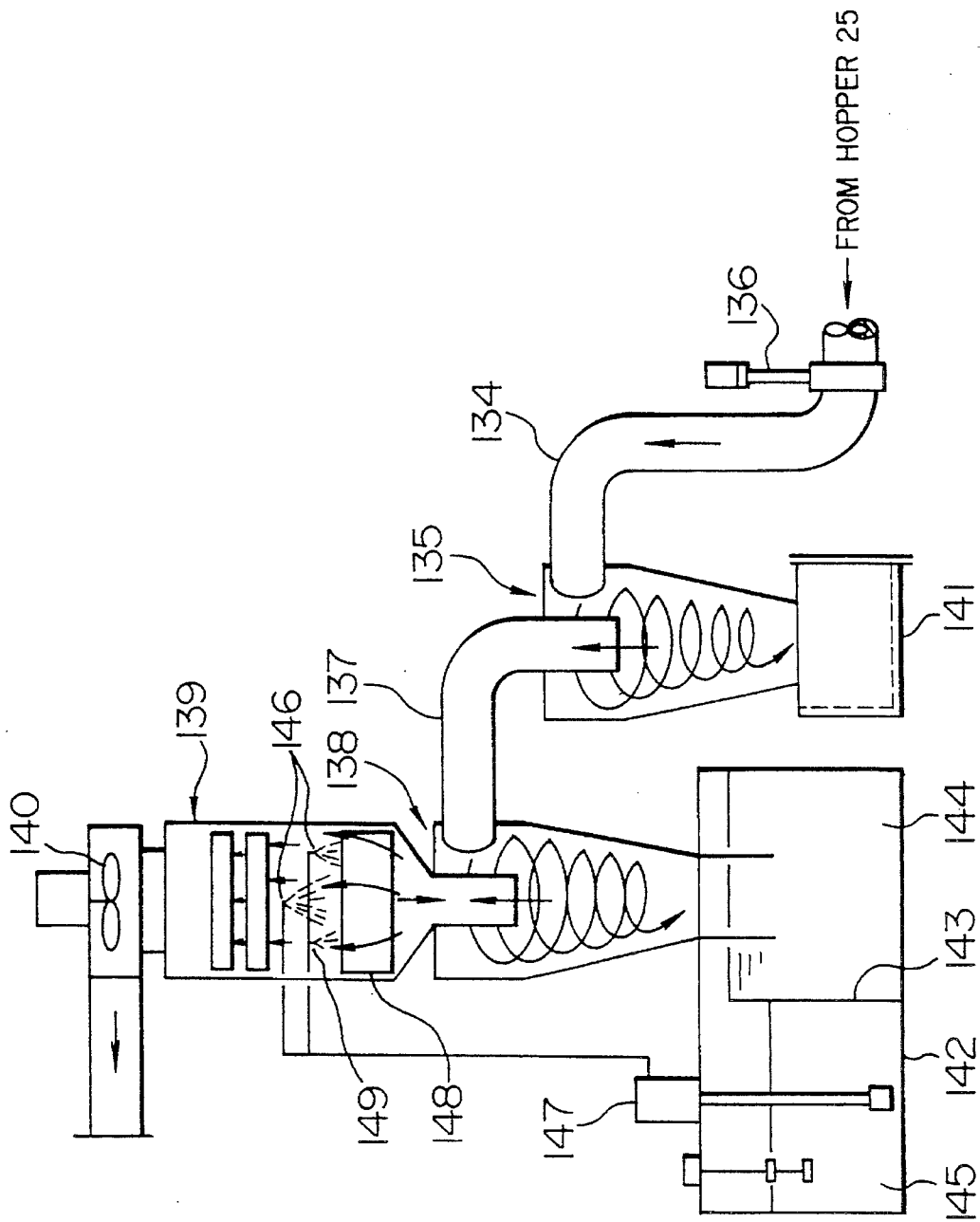
FIG. 9 is a schematic constructional view showing the essential portions of a magnesium collecting apparatus of the above aluminum vacuum brazing furnace.

An aluminum vacuum brazing furnace according to another embodiment comprises a furnace main body portion and a magnesium collecting apparatus. FIGS. 7 and 8 schematically show the furnace main body portion principally, and FIG. 9 schematically shows the essential portions of the magnesium collecting apparatus.

Referring to FIGS. 7 and 8, to the ceiling portion of the heating chamber 4 are connected end portions 28a of a gas passage 28 through which dry air or for example dry air of −40° C. is introduced into the heating chamber 4 for the purpose of exposing the inside of the heating chamber 4 to the atmospheric air. The gas passage 28 is extended to the outside of the furnace body 1 on the other end side thereof and is provided at an intermediate portion thereof with a gas valve 29 serving to open and close the gas passage. In this way, there is formed the air exposure means which is mentioned in the present invention.

Further, to the furnace body 1 is connected as well an end portion 130a of another gas passage 130 through which dry air is introduced into the furnace body 1 for the purpose of exposing the inside of the furnace body 1 to the atmospheric air, and this gas passage 130 is provided at an intermediate portion thereof with another gas valve 131 which serves to open and close the gas passage.

Figure 10:
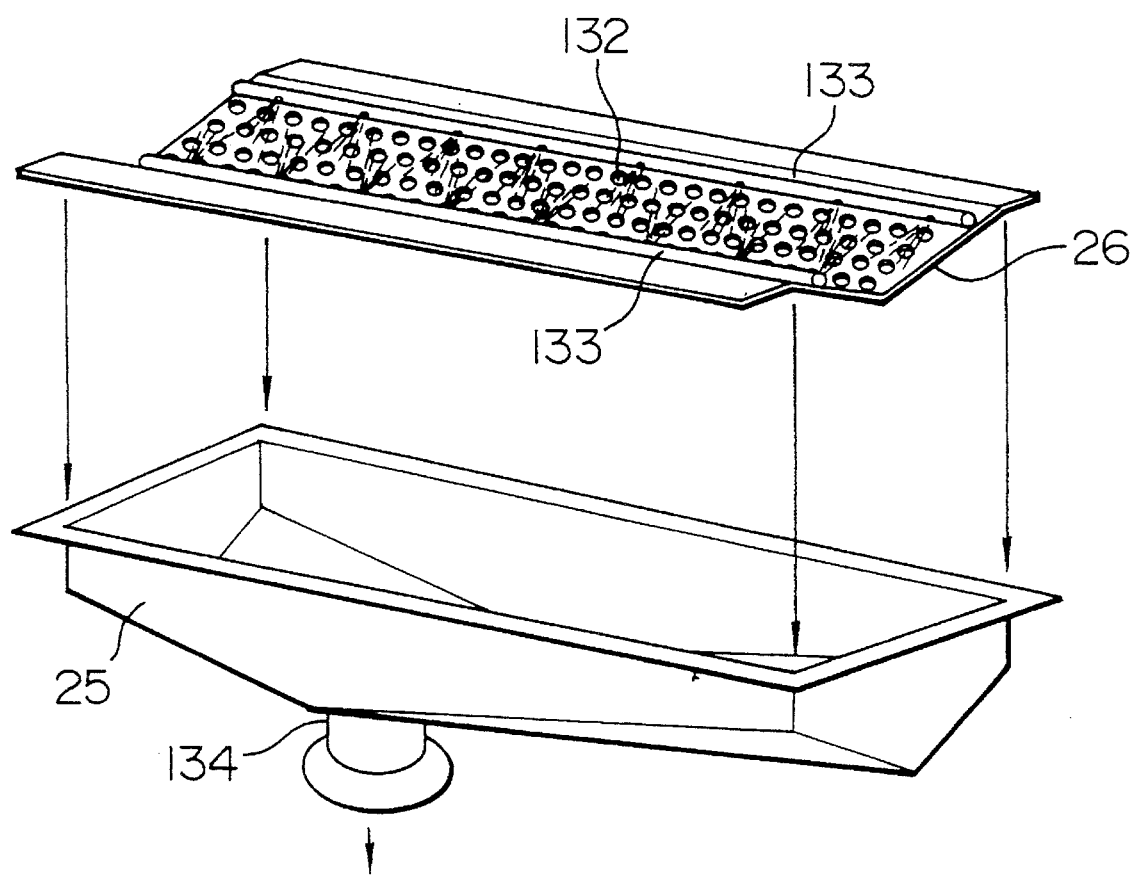
FIG. 10 is a perspective view of a receiving means of the above magnesium collecting apparatus.

The hopper 25 as the receiving means mentioned in the present invention is disposed below the heating chamber 4. This hopper 25 serves to collect magnesium oxide and the like which are to be produced when, by opening the gas valve 29 upon completion of the vacuum brazing, the inside of the heating chamber 4 is exposed to the atmospheric air, and to guide the same to a primary cyclone 135 which is disposed on the Incidentally, the hopper 25 is provided on the top thereof with the thermal reflecting plate 26 as shown in FIG. 10. The thermal reflecting plate 26 is formed therein with a large number of holes 132 for the purpose of increasing the absorbing power with which the magnesium oxide and the like in the heating chamber 4 are absorbed toward the hopper 25. Further, the thermal reflecting plate 26 is provided with blow-off pipes 133 which serve to flow off inert gas such as $N_2$ gas toward the central portion of the upper surface of the thermal reflecting plate 26 so as to whirl up the magnesium oxide on the upper surface of the thermal reflecting plate 26 to thereby improve the absorbing efficiency.

As shown in FIG. 9, the hopper 25 is connected to the primary cyclone 135 through a first pipe 134. The first pipe 134 is provided with a magnesium collecting valve 136 which serves to open and close the internal passage of the first pipe 134. The primary cyclone 135 is connected to a secondary cyclone 138 through a second pipe 137. The primary cyclone 135 has a first magnesium collecting tank 141 in which the captured magnesium oxide is collected. Above (downstream of) the secondary cyclone 138 is disposed a scrubber 139, and a fan 140 is disposed downstream of the scrubber 139. The secondary cyclone 138 has a second magnesium collecting tank 142 in which the magnesium oxide captured by the secondary cyclone 138 itself and the scrubber 139 is collected. The second magnesium collecting tank 142 is separated into two tank sections 144, 145 by a weir 143. One tank section 144 is located under the secondary cyclone 138 so that, in the tank section 144, the magnesium oxide captured by the secondary cyclone 138 and a water-insoluble and incombustible oil jetted through shower nozzles 146 in the scrubber 139 are made to flow and the magnesium oxide accumulates as being in the state of sludge. In the other tank section 145, the oil overflowing the one tank section 144 is made to flow. The oil in the other tank section 145 is drawn up by a pump 147, cooled as it is passed through a heat exchanger (not shown) and jetted through the shower nozzles 146. It is noted that, in FIG. 9, reference numeral 148 denotes a layer of glass balls. Further, the primary cyclone 135, the secondary cyclone 138, the scrubber 139 and the like correspond to the separating and collecting means mentioned in the present invention.

Then, after the lapse of the time required for the brazing process, the inside of the heating chamber 4 is exposed to the atmospheric air and, at the same time, collection of magnesium oxide is started. Air exposure is performed by opening the gas valve 29 and making dry air blow into the heating chamber 4. At this time, another gas valve 131 is also opened so as to make dry air blow into the furnace body 1 as well, thereby exposing the inside of the furnace body 1 to the atmospheric air. On the other hand, collection of the magnesium oxide is performed by opening the magnesium collecting valve 136 when the fan 140 is rotated or simultaneously with the starting of the fan 140. Incidentally, collection of magnesium is performed immediately before the brazing on the (n+1)-th cycle is started.

So, owing to the opening of the magnesium collecting valve 36 and the rotation of the fan 140, the magnesium oxide in the heating chamber 4 is absorbed toward the hopper 25 and guided to the primary cyclone 135 passing through the holes 132 in the thermal reflecting plate 26, the hopper 25 and the first pipe 134 in the mentioned order. And, the greater part (about 85~95%) of the magnesium oxide thus guided is captured by the primary cyclone 135 and accumulates in the first magnesium collecting tank 141. The magnesium oxide which are not captured by the primary cyclone 135 is guided to the secondary cyclone 138. And, part of the magnesium oxide thus guided is captured by the secondary cyclone 138 and accumulates in one tank section 144 of the second magnesium collecting tank 142. It is noted that about 98% of the absorbed magnesium oxide can be collected by the primary and secondary cyclones 135 and 138. And, the remaining magnesium oxide is guided to the scrubber 139 and made to flow in one tank section 144 of the second magnesium collecting tank 142 together with the oil jetted through the shower nozzles 146 so that it accumulates therein as being in the state of sludge.

As described in the foregoing, according to the present embodiment, it becomes possible to oxidize magnesium in the heating chamber 4 safely and positively by the air exposure means 28, 29 as well as to collect magnesium oxide automatically and efficiently by making use of the cyclones 135, 138, the scrubber 139 and the like. Accordingly, it becomes possible to omit the cleaning operation for removing the deposit of magnesium oxide as well as to collect non-oxidized magnesium with safety.

Incidentally, although the above-described embodiment is what is called internal heating type aluminum vacuum brazing furnace, the present invention is not limited to such internal heating type one but can be also applied to what is called external heating type aluminum vacuum brazing furnace besides this (see for example Japanese Patent Unexamined Publication Nos. 63-99070 and 63-99071).

Further, the magnesium collecting apparatus employed in the above embodiment comprises the primary cyclone 135, the secondary cyclone 138 and the scrubber 139 as its constituents, and however, it may comprise only the cyclone or only the scrubber provided that the collecting efficiency and the security can be assured.

Moreover, the scrubber 39 employed in the above embodiment is of wet type for the purpose of improving the dust collecting efficiency, and however, this not limitative and it is free to use the scrubber of dry type.

In addition, the above embodiment employs the box-type heater, and however, any type of heater can be used provided that it is freed from the inferior insulation attributable to the adhesion of magnesium to the electrodes, the irregular motion of the movable door attributable to the adhesion of magnesium to the ventilating hole and its vicinity and the like accident.

Furthermore, the form of the furnace body is not limited to the round type but may be the rectangular, elliptic or other type.

Besides, the above-described embodiment has been described as utilizing the batch-type furnace (in which the air exposure is carried out after every brazing process), and however, such system may be adopted that the heating chamber or preheating chamber of a continuous-type furnace (which is suitable for the mass production and in which the heating chamber is disposed between a forechamber and a rearchamber so as to maintain the inside of the heating chamber at a vacuum constantly) is exposed to the air periodically in accordance with the load amount of magnesium so as to collect magnesium.

Figure 3:
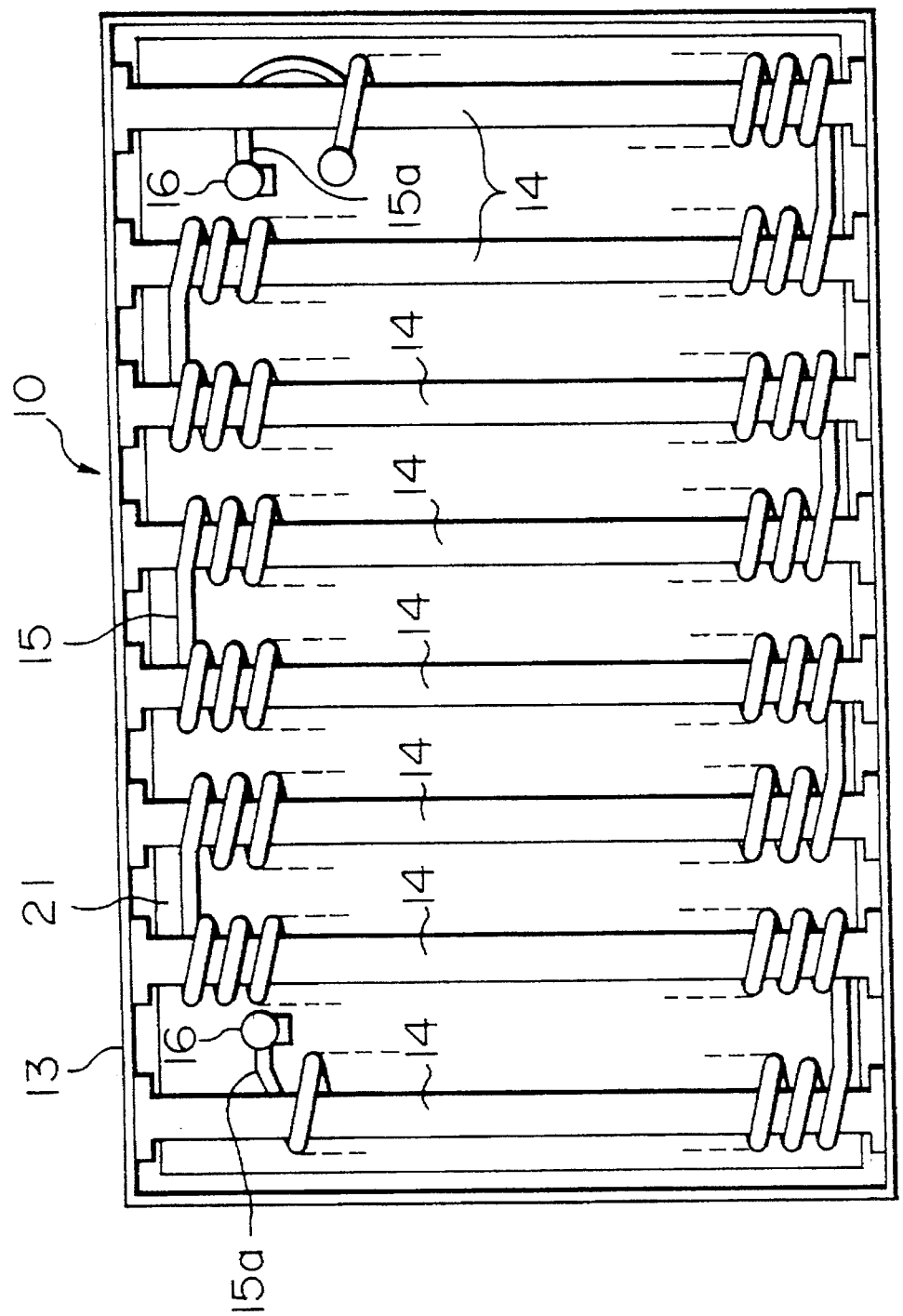
FIG. 3 is a front view of a heater.
Figure 4:
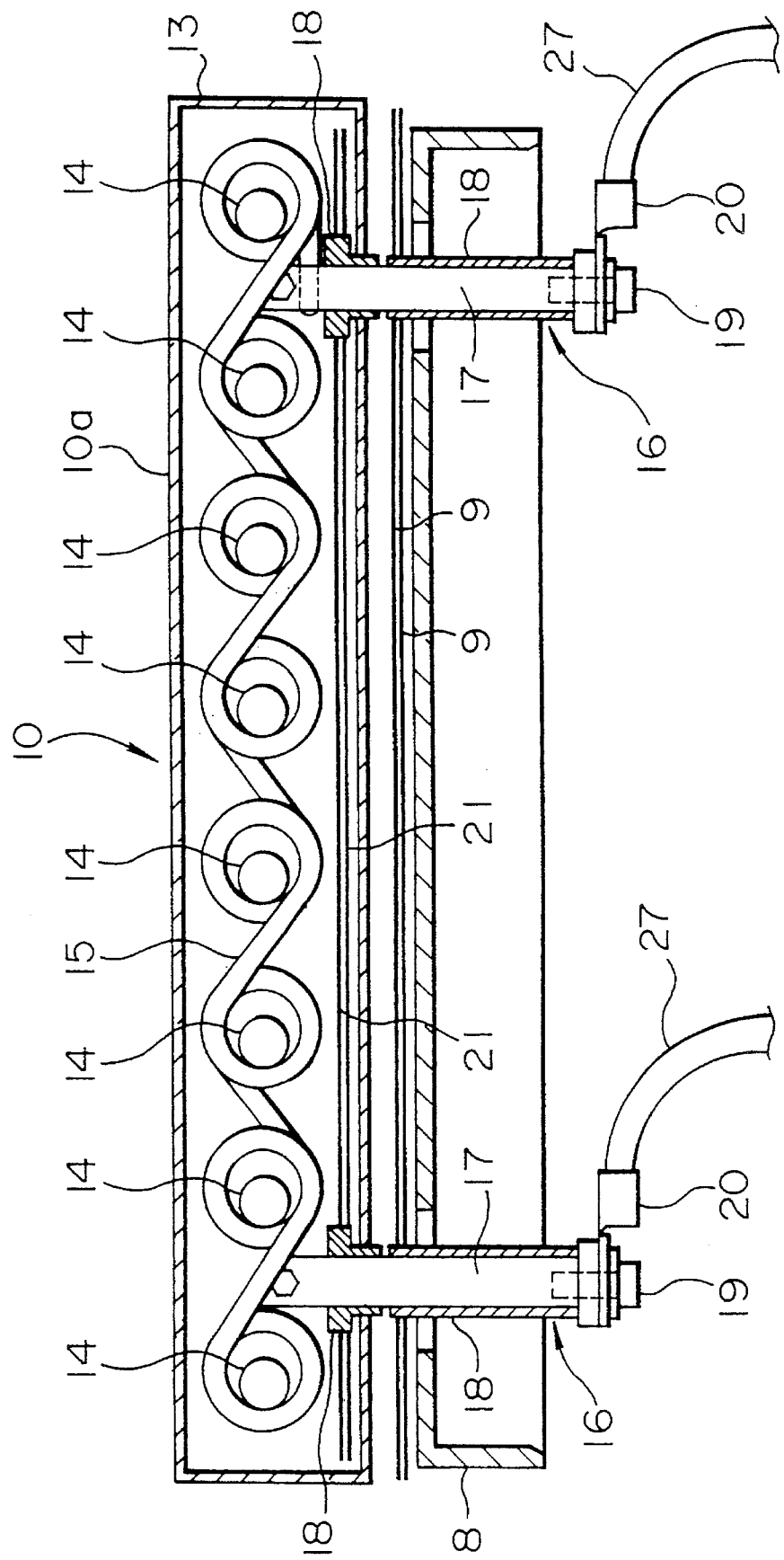
FIG. 4 is a sectional view of the same heater as viewed from a direction toward a side surface thereof.

Each heater 10 is constructed as shown in FIGS. 3 and 4.

In FIGS. 3 and 4, reference numeral 13 denotes the box made of stainless steel or the like. The box 13 is 1.2 mm thick and provided therein with a plurality of heating member support rods 140 supported by the box 13, and a heating member 15 is wound on each of the heating member support rods 14. the heating member 15 is made of a kanthal wire or the like. The heating member 15 is connected at opposite ends thereof to electrode units 16, respectively. Each electrode unit 16 comprises an electrode rod 17 having an end portion 15a of the heating member 15 fixed to one end thereof, a ceramic insulator 18 provided around the electrode rod 17, a bolt 19 secured to the other end of the electrode rod 17, and a terminal 20 fixed to the other end of the electrode rod 17 by means of the bolt 19 and having the tip end of a heater cable 27 secured thereto. It is noted here that, as is obvious from FIG. 4, the ceramic insulator 18 is partly received within the box 13 and partly taken out from a back 10b of the box 13. A single or a plurality of radiation preventive thermal reflecting plates 12 are disposed on the floor of the box 13. The thermal reflecting plate 12 is made of stainless steel or the like and is 0.5 mm thick. Further, the opening portion of the box 13 is covered with a removable heat radiation cover 10a. the heat radiation cover 10a is made of stainless steel or the like and is 1.2 mm thick so that it is guaranteed up to the maximum surface temperature 800° C. Incidentally, the heating member 15 of the aluminum vacuum brazing furnace heater 10 shown in FIGS. 3 and 4 is the coiled one, and however, this is not limitative but may be a strip-shaped one additionally.

The heater 10 constructed as described above is attached on the inner surface of the frame forming the wall 8 of the heating chamber 4 through the intermediary of a single or a plurality of thermal reflecting plates 9 as shown in FIG. 4. It is noted that the heater 10 is also attached on each of the inner surfaces of the front door 22 and the rear door 23 in the same manner as described above.

The heating chamber 4 is provided on the ceiling thereof with the thermal reflecting plate 24 as well.

Incidentally, the hopper 25 which serves to collect magnesium oxide and the like produced due to the exposure of the inside of the heating chamber 4 to the atmospheric air after the vacuum brazing, is disposed below the heating chamber 4 within the furnace body 1, and the thermal reflecting plate 26 is provided on the top of the hopper 25.

As has been described above, according to the present embodiment, the ceramic insulator 18 which is the constituent of the electrode unit 16 of the heater 10 is located both within and at the back of the box 13 and, further, since the heat radiation cover 10a put over the opening portion of the box 13 reaches a high temperature, the evaporated magnesium is, so to speak, reflected by the surface of the heat radiation cover 10a and prevented from entering within and to the back of the box 13, and accordingly, there is little possibility that the evaporated magnesium adheres to the ceramic insulator 18. For this reason, it is possible to prevent a short-circuit accident of heater resulting from the reduction of the insulation ability of the ceramic insulator 18 attributable to the adhesion of the evaporated magnesium.

Further, according to the present embodiment, the heating member 15 and part of the electrode unit 16 re received within the box 13 and the opening portion of the box 13 is covered with the heat radiation cover 10a, and accordingly, when the heating chamber 4 is exposed to the atmospheric air, the scattering powdered magnesium oxide produced due to the oxidization of the evaporated magnesium only adheres to the surface of the flat heat radiation cover 10a and the like without adhering to the heating element 15, the electrode unit 16 and the like. For this reason, the cleaning operation for removing the magnesium oxide becomes very simple.

Moreover, as a result of the comparison between the aluminum vacuum brazing furnace heater 10 of the present invention and the conventional bare-type heater, in case that the size of the heater is 425 mm in length and 380 mm in width, the maximum difference in temperature between the various portions of the conventional heater was about 150° C., while the maximum difference in temperature between the various portions of the aluminum vacuum brazing furnace heater 10 was drastically reduced to about 50° C. And, in case that the aluminum vacuum brazing furnace heater 10 was placed in a vacuum, this temperature difference became very small so as to be about 20° C. In consequence, according to the aluminum vacuum brazing furnace heater 10 of the present embodiment, the thermal uniformity can be improved remarkably as compared with the conventional bare-type heater.

In addition, in case that the aluminum vacuum brazing furnace heater 10 of the present embodiment was applied to the aforementioned aluminum vacuum brazing furnace, as the front door 22 was opened after finishing the brazing process, the temperature of the aluminum vacuum brazing furnace heater 10 was lowered to about 400° C., and however, this temperature drop was smaller by about 200° C. as compared with the conventional bare-type heater. In consequence, according to the aluminum vacuum brazing furnace heater 10 of the present embodiment, the heat retaining property of the heater, that is, the ability of heater to maintain the temperature in the heating chamber 4 at elevated temperatures after finishing the brazing process during the time wherein the front door 22 is opened until it is closed for the next brazing process, is improved remarkably as compared with the conventional bare-type heater, with the result that an excellent energy saving effect can be obtained.

What is claimed is:

1. A method for vacuum brazing aluminum, comprising the steps of:

conveying aluminum members which are to be brazed into a heating chamber having an interior surface, at least one of the aluminum members having a magnesium-containing brazing metal applied thereto;

evacuating an atmosphere from the heating chamber to thereby obtain a vacuum atmosphere within the heating chamber;

heating the interior surface of the heating chamber to a temperature greater than that at which magnesium vapor adheres to the interior surface;

brazing the aluminum members by heating the heating chamber, thereby liberating magnesium vapor from the magnesium-containing brazing metal;

after said step of brazing, flowing atmospheric air into the heating chamber while maintaining the heating chamber above the melting point of magnesium to thereby oxidize the magnesium vapor; and removing the brazed aluminum members from the heating chamber.

2. The method for vacuum brazing aluminum according to claim 1, wherein the heating chamber includes a moveable wall portion, wherein said step of heating the interior surface of the heating chamber includes heating the moveable wall portion.

3. The method for vacuum brazing aluminum according to claim 1, further comprising the steps of collecting and removing oxidized magnesium from the heating chamber.

4. The method for vacuum brazing aluminum according to claim 1, wherein said steps of heating the interior surface of the heating chamber and brazing the aluminum members are performed simultaneously.

\* \* \* \* \*